__(12)__ United States Patent
Herrod et al.

(10) Patent No.: US 7,461,384 B2
(45) Date of Patent: Dec. 2, 2008

(54) SOFTWARE METHOD FOR EMULATING A SERIAL PORT BETWEEN APPLICATIONS FOR ENABLING COMMUNICATIONS BY MOBILE BAR CODE READERS AND COMPUTER TERMINALS IN WIRELESS NETWORKS

(75) Inventors: Allan Herrod, Mission Viejo, CA (US); Curt Croley, Stony Brook, NY (US); James Fuccello, Patchogue, NY (US); Ted Trask, Melville, NY (US); Donald Schaefer, Wantagh, NY (US); Sudhir Bhatia, Brooklyn, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 889 days.

(21) Appl. No.: 10/079,972

(22) Filed: Feb. 20, 2002

(65) Prior Publication Data

US 2003/0158974 A1 Aug. 21, 2003

(51) Int. Cl.
*G06F 13/00* (2006.01)
(52) U.S. Cl. ............. 719/328; 235/462.01; 235/472.01; 235/472.02
(58) Field of Classification Search ................. 719/328; 235/462.01, 472.01, 472.02
See application file for complete search history.

(56) References Cited

U.S. PATENT DOCUMENTS

| 5,767,502 | A | * | 6/1998 | Ferland et al. ......... 235/462.48 |
| 5,812,865 | A | | 9/1998 | Theimer et al. ............. 395/800 |
| 5,844,893 | A | | 12/1998 | Gollnick et al. ............. 370/329 |
| 6,101,531 | A | * | 8/2000 | Eggleston et al. ........... 709/206 |
| 6,112,092 | A | | 8/2000 | Benveniste ................... 455/450 |
| 6,151,584 | A | | 11/2000 | Papierniak et al. ............. 705/10 |
| 6,252,884 | B1 | | 6/2001 | Hunter ....................... 370/443 |
| 6,314,094 | B1 | | 11/2001 | Boys ......................... 370/352 |
| 6,314,108 | B1 | | 11/2001 | Ramasubramani et al. .. 370/465 |
| 6,665,314 | B1 | * | 12/2003 | Liebenow .................... 370/477 |
| 6,760,804 | B1 | * | 7/2004 | Hunt et al. ................... 710/313 |
| 7,028,904 | B2 | * | 4/2006 | Schmidt et al. ........ 235/462.45 |
| 2001/0029520 | A1 | * | 10/2001 | Miyazaki et al. ............. 709/200 |
| 2002/0169789 | A1 | * | 11/2002 | Kutay et al. ............... 707/104.1 |

FOREIGN PATENT DOCUMENTS

WO    WO 01/50292 A1    7/2001

* cited by examiner

*Primary Examiner*—Andy Ho
(74) *Attorney, Agent, or Firm*—Amin, Turocy & Calvin, LLP

(57) ABSTRACT

An application program interface in a computer for allowing application programs executing in the computer to access a wireless RF input/output facility or port in the computer, which emulates a serial port in the computer by the steps of opening a handle to a virtual COM port from an application program executing in the computer; opening and configuring a serial port by the application program; starting a thread to receive characters to be communicated through the RF facility; and utilizing the virtual COM port to open a component interface to allow communications through wireless RF communications.

13 Claims, 8 Drawing Sheets

SOFTWARE METHOD FOR EMULATING A SERIAL PORT BETWEEN APPLICATIONS FOR ENABLING COMMUNICATIONS BY MOBILE BAR CODE READERS AND COMPUTER TERMINALS IN WIRELESS NETWORKS

BACKGROUND OF THE INVENTION

1. Reference to Related Applications

This application is related to copending U.S. patent application Ser. No. 09/967,358 filed Sep. 28, 2001.

This application is related to copending U.S. patent application Ser. No. 09/686,755 filed Oct. 10, 2000, which is a divisional of Ser. No. 09/166,816, filed Oct. 5, 1998.

This application is also related to copending U.S. patent Ser. No. 09/823,208 filed Mar. 30, 2001, which is a division of Ser. No. 09/107,838, filed Jun. 30, 1998, now U.S. Pat. No. 6,237,053.

2. Field of the Invention

The present invention relates to portable computers, such as bar code reader computer terminals connected to wireless networks, and more particularly to the network architecture, operating system APIs, configuration software, and inter-network messaging and communications protocols needed to support communications with "legacy" application programs being executed in modern embedded operating systems in mobile units operated in such networks, and from network to network.

3. Background of the Invention

Computers have evolved to such a degree that portable laptop, handheld, wearable and other small computers and systems with embedded processors have become quite common. Additionally, real time operating systems for use with such computers have been developed which lack much of the processing power and memory requirement of larger computers, and have just enough power and memory to perform specific dedicated tasks or user applications. These computers are used in a number of different applications, including inventory control, word processing, personal file management, web browsing, email, and data collection, or dedicated applications in appliances and other equipment.

Typically, these computers are used with a wide variety of input devices, including keyboards, bar code symbol scanners, imagers or scanners, microphones, digital cameras, and wireless RF communications transceivers, among others. The function of these input devices is to allow information (audio, bar code symbol, video, text, etc.) to be received by the computer and transferred to an application program in a form the application can use. Generally, the task managing these input devices falls on an application program containing routines, which were developed on a case by case basis. For example, a word processor may require input from a keyboard. Therefore, the word processor will be designed with some code routines that cause the word processor to wait for input from a keyboard, and when input is received, to print the input on the screen for displaying to the user.

The Windows CE operating system of Microsoft Corporation is a paradigmatic operating system for use in such classes of applications. Windows CE is highly compartmentalized. The OEM Adaptation Layer (known as the OAL) interfaces the Windows CE kernel and the OEM hardware, and provide platform initialization, interrupt service routines (ISRs), real-time clock (RTC), interval timer, debugging, interrupt enable/disable, and profiling. The Windows CE kernel implements process and thread management, preemptive scheduling, memory management, synchronization mechanism, debugging support, profiling and exception handling.

Third-party devices that are connected through a special port can be directly driven by the native serial driver, or by an OEM driver, for example, applications can directly open "COM1:" which is a port name (syntactically it is a port name since it ends with a colon) and directly communicate with that device, if the application can process the data. Alternatively, an OEM driver may be installed (e.g. COM4:) which internally uses COM1:, but also processes the data and therefore provides applications with a simplified interface.

For instance, consider the application of reading an image from an input device such as a sensor array, such as a camera. If the read operation is done by an application through "COM1:" the application must write the proper code to get the digital image, and read the data back. On the other hand, the application can use a handle, which is a resource identifier. Thus, reading from a camera driver can return a bitmap handle, which is the equivalent of formatted data.

Device drivers are software that allows the operating system to recognize the devices attached to the platform. Device drivers also present device-related services to applications.

There are several different types of drivers including native drivers, stream interface drivers, and Universal Serial Bus (USB) drivers. They can expose a stream interface, a custom set of functions, or rely on the exiting CE API (input-event system and installable file system). The Network Driver Interface Specifications (NDIS) drivers are derived from Windows NT. They allow use of the networking protocol (TCP/IP, IrDA) to be independent of the network interface card (NIC).

Native drivers control low-level devices are built-in with the CE platforms and support such functions as audio, battery, keyboard, notification LED, serial port, touch screen, and the PC Card socket.

One increasingly important type of mobile computer are those which are coupled to or incorporates a bar code symbol reader, and are now in very common use for portable data collection applications. Typically, a bar code symbol comprises one or more rows of light and dark regions, typically in the form of rectangle. The relative widths of the dark regions, the bars and/or the widths of the light regions, the spaces, encode data or information in the symbol. A bar code symbol reader illuminates the symbol and senses light reflected from the regions of differing light reflectivity to detect the relative widths and spacings of the regions and derive the encoded information. Bar code reading data collection application software, executing on such mobile computers, improve the efficiency and accuracy of data input for a wide variety of applications. The ease of data input in such systems facilitates more frequent and detailed data input, for example, to provide efficient taking of inventories, tracking of work in progress, and make use of applications programs that may communicate to and interoperate with other applications programs operating on a remote host or server which the mobile computer communicates with through a wireless network.

Wireless local area networks use infrared or radio frequency communications channels to communicate between portable or mobile computer terminals and stationary access points or base stations. These access points are in turn connected by a wired (or possibly wireless) communication channel to a network infrastructure which connects groups of access points together to form a local area network, including, optionally, one or more servers or host computer systems.

SUMMARY OF INVENTION

1. Objects of the Invention

It is a general object of the present invention to provide wireless communications capability for applications in processor units executing simple, embedded operating systems in a computer network.

It is another object of the invention to provide a method for allowing applications running on different clients in a network to utilize serial port data transfer operations, by adapting to different data transfer component interfaces.

It is a further object of the present invention to provide a software module that opens a handle establishes to a virtual COM port in the computers and in response to each connection request to a serial COM port by an application, determines the most suitable communications interface and corresponding sockets in the computer to enable a connection between the application in the first computer and a communications facility over the external communication link.

It is another object of the present invention to provide software in a mobile unit for assuring that connectivity is maintained over a channel between different applications by available communication channels, paths or protocols as may be required by emulating a serial port.

It is another object of the present invention to provide a software facility in a mobile unit for assuring that logical connectivity is transparently maintained between applications executing in remote units, regardless of lower level software operations of switching software sockets, communication ports, communication channels, network paths or protocols as may be required for physical media or network reasons.

It is another object of the invention to provide a method for allowing applications designed for use with a standard communications API for wired computer networks to operate in wireless communications networks by utilizing additional API features that adapt to less reliable network data transfer conditions.

It is still a further object of the present invention to provide a virtual COM port API to interface to standard commercially available serial communication interface APIs in the computer, and in response to each connection request by the first application, for processing and transferring data originated by the first application, to a corresponding COM port, to enable a connection between an application in the first computer and a second application in the second computer over a wireless communication link.

It is an even further object of the invention to provide a method which can be used to accomplish one or more of the above objectives.

Additional objects, advantages and novel features of the present invention will become apparent to those skilled in the art from this disclosure, including the following detail description as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of significant utility.

2. Features of the Invention

The present invention relates to an emulation of an application program interface for use in a computer having an operating system which includes a facility for interfacing to a serial port. For such computer systems, application programs may be written providing input and output through the serial port and the API functions to transfer the data automatically from the application program to and from the serial port without user intervention. The present invention recognizes the need for a computer to transfer information through input/output facilities other than a serial port, notwithstanding that drivers or other facilities may not be present in the operating system nor would the operating system include APIs for such I/O facilities. One of the increasingly popular I/O facilities is through a wireless radio link. The present invention therefore contemplates the development of an API for a wireless radio transceiver by emulating a serial port API. More particularly, the present invention provides software for installing in an operating system of a computer which acts as a virtual COM port or proxy for an API such as a serial port API, and substitutes in its place an API for a designated I/O facility by emulating the functionality of the serial port API.

Another way of looking at the present invention, is that it provides a software facility for emulating a physical port for which application programs as well as operating system facilities are utilized. There may be technical reasons for deciding to utilize a different I/O facility such as bandwidth, access time, load, protocol compatibility, security, or other considerations. It is not always possible to change the existing application programs or the APIs or drivers in the operating system in the computer. Moreover, there are many existing software applications that would like to take advantage of new embedded operating system platforms such as Windows CE. It is therefore desirable to provide software to emulate such serial physical port facilities while utilizing an entirely new I/O facility, including a new physical layer. In the preferred embodiment according to the present invention, the new facility is a high data rate wireless radio link such as an IEEE 802.11 link or a wide area network link while the computer and operating system has more generically been designed for use with a standard serial port or serial link such as RS232C or other connection.

More particularly, the present invention is implemented in a Microsoft Pocket PC or Windows CE operating system environment which utilizes an Active Sync API facility. The Active Sync is a component of the operating system and normally operates with a physical serial port present on the computer or portable digital system. In order to implement radio connectivity as an I/O feature, the present invention installs software in the Active Sync API so that although application programs would communicate with the Active Sync API as if the data was being transferred over a normal serial port. In fact, the data is transferred from the API to a radio card driver. In the preferred embodiment, the radio card driver is a Bluetooth or IEEE 802.11 driver which packetizes the serial data stream into Bluetooth or IEEE 802.11 frames, which are then relayed or transferred to a radio transmitter for transmission by via an antenna according to the physical layer specification of the standard. The radio drivers are called by the proxy instead of the serial port drivers so that the data is transmitted to the transceiver card rather than to a physical serial port.

The present invention provides a method of maintaining connectivity of data communication from a first application resident in a first mobile computer to a second application resident in a second computer wherein the data is transmitted over a wireless data communications network by determining, in the first mobile computer, that communications between the mobile computer and the second computer is being requested, and that use of the serial COM port is necessary in order to provide communications: The method further provides for configuring the serial port, storing and queuing the data messages in the computer, while a wireless channel is established; and re-establishing a link (or changing the operating characteristics of the same link) between in the respective computers in order to continue a session between the first and second applications in the first and second computer respectively.

The present invention also provides a method of maintaining connectivity and synchronization of data from a first application resident in a first mobile computer to a second application resident in a second computer wherein the data is transmitted over a data communications network including a plurality of stationary access points and at least one communications controller in communication with the access points, and a plurality of remote mobile computers, at least some of the mobile computers being capable of communicating with at least two of the access points when located within a predetermined range therefrom and being normally associated with and in communications with a single one of such access points, each computer having a unique user address, the steps include establishing communication and association between a first mobile computer with a first access point and with said communications controller associated with such access point through an associated port of the communications controller; registering the user address of said first mobile computer with said communications controller; utilizing the communications controller for processing messages destined for the first mobile computer and transferring such processed messages through the communications controller to the associated access point and the first mobile computer; establishing a first virtual and real sockets in the first computer in response to each connection request by the first application for processing data originated by the first application and corresponding second virtual and real sockets in the second computer to enable a connection between the first computer to a second application in the second computer over the external communication link; establishing in the second computer a second virtual socket for each connection request by the first application wherein the second virtual socket corresponds to a first virtual socket established in the first computer.

The novel features and characteristics of the invention are set forth in the appended claims. The invention itself, however, as well as other features and advantages thereof, will be best understood by reference to a detailed description of a specific embodiment, when read in conjunction with the accompanying drawings.

DESCRIPTION OF DRAWINGS

Like reference symbols in the various drawings indicate like elements.

DESCRIPTION OF THE PREFERRED EMBODIMENT

Figure 1:
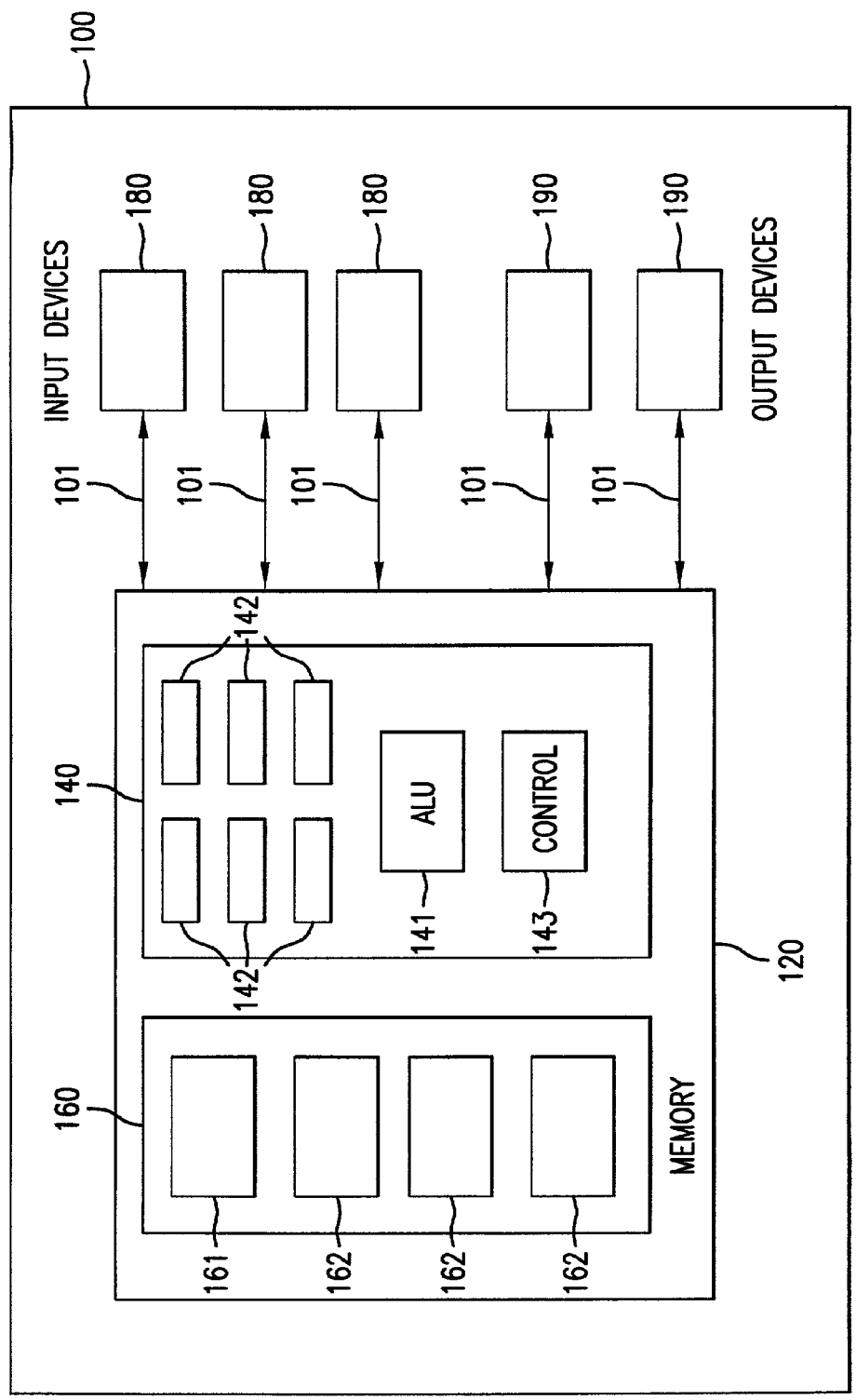
FIG. 1 illustrates a block diagram of a mobile unit.

Details of the present invention will now be described, including exemplary aspects and embodiments thereof. Referring to FIG. 1, an operating environment for the preferred embodiment of the present invention is depicted in highly simplified block diagram form, illustrating a mobile computer unit 100 with a computer subassembly 120 that comprises at least one high speed processing unit 140 (CPU), in conjunction with a memory subsystem 160, an input device 180, and an output device 190. Moreover, these elements are interconnected by a bus structure or individual interface connections 101.

The illustrated CPU 140 is of familiar design and includes an ALU 141 for performing computations, a collection of registers 142 for temporary storage of data and instructions, and a control unit 143 for controlling operation of the unit. Any of a variety of processors, including those from Intel, Motorola, NEC, Cyrix, AMD, Nexgen and others are equally preferred for CPU. Although shown with one CPU, the computer subassembly system may alternatively include multiple processing units.

The memory subsystem 160 includes main memory 161 and secondary storage 162. Illustrated main memory 161 is high speed random access memory (RAM) and read only memory (ROM). Main memory can include any additional or alternative high speed memory device or memory circuitry. Secondary storage 162 takes the form of long term storage, such as ROM, optical or magnetic disks, organic memory or any other volatile or non-volatile mass storage system. Those skilled in the art will recognize that memory can comprise a variety of and/or combination of alternative components.

The input and output devices 180 and 190 are also standard and well known. The input device 180 can comprise a keyboard, keypad, touch screen, trigger switch, buttons, thumb wheel, bar code reader, digital imager; video camera; mouse, track ball device, audio device (e.g., a microphone, etc.), or any other device providing input to the computer unit. The output device 190 can comprise a display, such as a liquid crystal display (LCD), a printer, an audio device (e.g. a speaker, etc.), or other device providing output for the computer unit. The input and output devices can also include network connections, radio transceivers, modems, or other devices used for communications with other computer units or devices.

Figure 2:
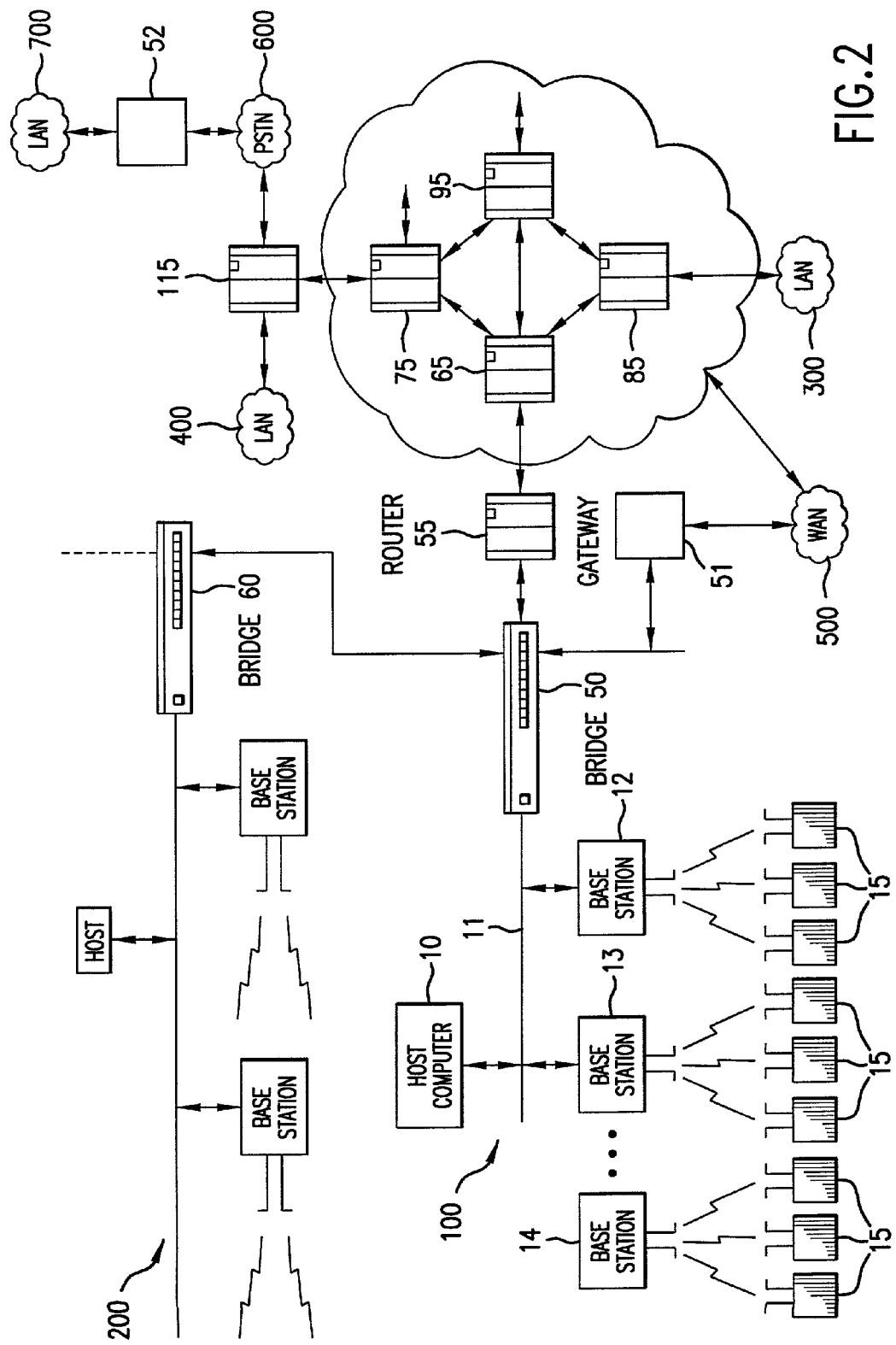
FIG. 2 illustrates a network environment in which the present invention can be implemented.

FIG. 2 shows a diagrammatic representation of a typical networking environment consistent with the present invention in a preferred embodiment of the home, small office, school, or similar public or private space, designated as reference number 100. The physical hardware components reside at the lowermost OSI layer, or physical layer, and include various nodes distributed along the network link or cabling. Although the term "node" broadly refers to all types of physical devices attached to the network link, only client and server nodes are depicted in FIG. 2.

More specifically, FIG. 2 illustrates clients and servers interconnected through a network link, although additional clients and servers, as well as other types of nodes, may be distributed along the network link as well. As used in this specification, the term "client" will generally denote a peripheral device or network appliance of some type associated with a user. The term "server" includes any device directed for controlling and coordinating shared usage of an network resource, such as an access point, storage unit, or printer, or website content or data.

Referring now to the figures, FIG. 2 shows a data communications network according to one embodiment of the invention. A first local area network 110 is illustrated, which is a preferred embodiment includes a host processor 10 connected by a wired communications link 11 to a number of stationery access points or base stations 12, 13; other base stations 14 can be coupled to the host through the base stations or by an RF link. Each one of the base stations 12, 13, 14 is coupled by an RF link to a number of remote portable mobile units 15. In one embodiment, the portable mobile units 15 are hand-held, battery-operated data terminals, or voice communication handsets such as described in U.S. Pat. Nos. 5,029,183; and 6,119,944 all assigned to Symbol Technologies, Inc., and each incorporated herein by reference. In addition to the architecture shown if FIG. 2, wireless internet working nodes may also be used, such as described in U.S. Pat. No. 5,901,362 of IBM, which is hereby incorporated by reference, or as an ad-hoc network without fixed or base stations.

Although hand-held, laser scanning bar-code reader data terminals are mentioned, the data terminals may also include bar-code readers of the CCD or wand type, and may be portable or stationery or worn by the user rather than handheld. An example of a stationary installation will be described in FIG. 7, and a wearable unit in FIG. 8. The mobile units 15 may also function as voice communication handsets, pagers, still image or video cameras, cellular telephones, AM/FM radio broadcast receivers, or any combination of the foregoing. Other types of data gathering devices may be utilized as terminals and use the features of the invention, such as temperature, pressure, biohazard or other biophysical or environmental measuring devices, event counters, voice or sound activated devices, intrusion detectors, etc.

Various other types of portable terminals may be advantageously employed in a network having features of the invention; these portable terminals ordinarily could utilize data entry devices such as keyboards, touch screens, floppy magnetic disks, CD ROMs, PC cards or compact flash (CF) cards, magnetic stripe cards, RFID tags, biometric ID sources, SIM devices, smart cards, electronic key (e.g. "Ving") access cards, or the like, as well as data output devices such as displays, printers, audio speakers, buzzers, vibrators, disk drives, CD ROM or DVD "burners", or other I/O devices for providing an alert, display, or copy on suitable media of the information detected, transmitted and/or received by the terminal. In this embodiment used as an A>illustrative example, there may be from one up to sixty-four of the base stations (three stations being shown in the Figure) and up to several hundred of the remote portable units; of course, the network is scalable and may be expanded by merely changing the size of address fields and the like in the digital system, as will appear, but a limiting factor is the RF traffic and attendant delays in waiting for a quiet channel.

The first LAN 100 may be coupled to additional LANs 200, 300, 400 etc. through controllers such as bridges 50, 60, etc. or routers 55, 65, 75, 85, etc., or to a WAN 500 through a gateway 51; to the Public Switched Telephone Network (PSTN) 600 through a gateway 115. The PSTN may also couple to other LANs 700 through a gateway 52.

The network may also include a server 95 which may be associated with an Internet site, and may include a plurality of software components that can be accessed by agent program. Such components may include one or more object classes including applets, servlets, Java Beans™, or in general any executable unit of code.

The server may be a directory server or standard database management system. The server 95 may include facilities for address translation, formatting, storage, and encryption key management, among others.

These larger or more complex communications networks, as seen in FIG. 2, would ordinarily be used in a manufacturing facility, office building complex, warehouse, retail establishment, shopping malls, or like commercial or public facility, or combination of these facilities, where the data-gathering terminals or mobile units would be used for inventory control in stockroom or receiving/shipping facilities, at checkout (point of sale) counters, for reading forms or invoices of the like, for personnel security checking at gates or other checkpoints, at time clocks, for manufacturing or process flow control, for providing information to customers (such as location, and directions to a site or person) and many other such uses.

The steps carried out by a mobile unit 15 which is not currently associated to an access point in selecting an access point according to the IEEE 802.11 standard are described as follows. The mobile unit (MU) sends out a probe packet to all access points (APs), typically at the lowest data rate it is otherwise able to use with the network. The probe packet contains the mobile unit source address but has no destination address and hence any access point that detects the probe packet and is capable of responding at the same data rate must send a response. Accordingly, the probe packet is detected by all access points within range and a subset of those access points sends out a probe response packet. An evaluation of the signal quality and possibly other factors is made by the MU of the communications with the most eligible access point (if any) at the highest data rate. If such communications are acceptable, the MU will associate with the selected AP.

If the MU is already associated with an access point and operating at a data rate lower than the highest data rate, then depending upon the performance statistics (to be described below), it will carry out an update probe at predetermined intervals to see if it can operate at a higher data rate, and associate with a new AP at the higher data rate. Such association with different AP, known as roaming, is typically encountered when the MU is moved in and out of range, e.g. to and from the periphery of the range of the original AP, but may occur even if the mobile unit is motionless during conditions of fluctuations in traffic on the AP with which the MU is associated.

The MU can be used for a variety of information retrieving and computing purposes including but not limited to Internet access, data base lookup, order entry, messaging, document preparation and word processing, scheduling, mathematical computation, and the like. For these purposes, MU are provided with operating system software. In an embodiment, the operating system can be Windows CE, Windows 9x, Windows 2000, or NT platforms or the Stinger version of Windows CE. In other embodiments, the operating system can be Mac OS, Palm OS, Symbian Generic Technology, VRTX RTOS, or Linux. In one embodiment, the memory 161 can be random access memory into which the operating system is loaded. In another embodiment, the memory 161 can be any type of firmware such as EPROM or EEPROM into which the operating system is "burned".

The base stations 12, 13, 14 each utilize a an RF transceiver connected to an antenna for RF transmission and reception from the remote units 15 using a transmit/receive exchange protocol. In one embodiment, the exchange protocol is similar to a collision—sense multiple access (CSMA). An additional RF transceiver can be used as an RF link to and from other base stations, if necessary.

Base stations 12, 13, 14 are typically stationary units that use line power and often not accessible to an operator. The RF signal path in a typical environment is changeable because equipment in the environment may move around as well as the locations of the remote units 15. As a result, the particular base station that is in communications with the remote 15 can change. In an implementation, a "hand-off" protocol is used to change the base station that is designated to communicate with the remote unit 15. In this manner, a remote unit 15 has a confirmed virtual link with only one base station at a time, although other base stations may be in range. The base stations 12, 13, 14 act as intermediaries for the communication link between the remote unit 15 and the host computer 10. The main function of the base stations 12, 13, 14 is to relay data between the remote units 15 and the host computer 10.

Figure 3:
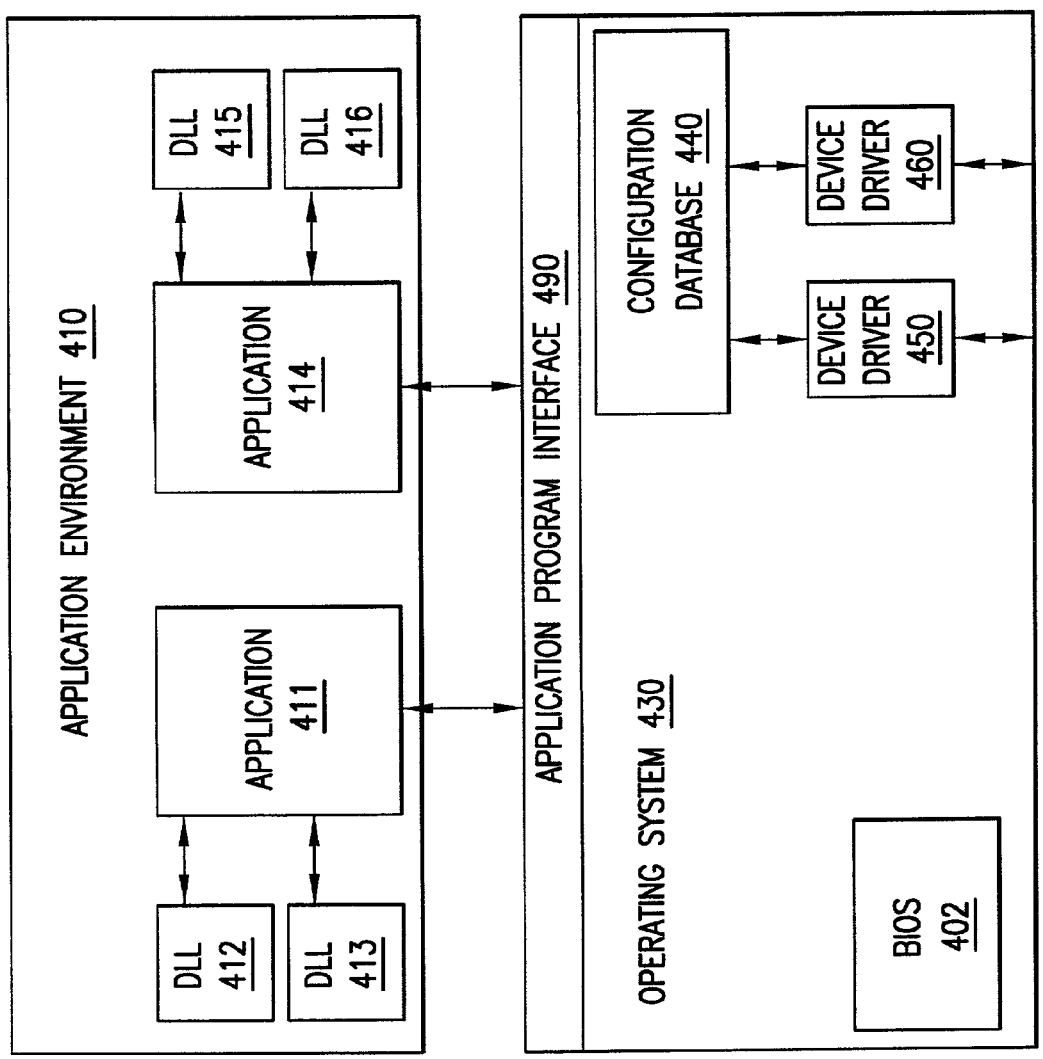
FIG. 3 illustrates an operating system and application environment in the mobile unit.

FIG. 3 illustrates an operating system having an application environment. As discussed above the operating system 430 can be one of the various Windows environments. The operating system 430 provides software to manage configure, enable and allocate physical resources of the MU 15. For example, the operating system 430 may include a memory allocation algorithm to allocate the memory 161 among various software tasks. Additionally, the operating system includes instructions from the memory to control the RF transmissions and receptions as well as data flow between the data acquisition device and the RF transceiver.

Since the present invention is implemented in software, a more detailed background discussion of standard operating system features is in order. The Windows client/server operating system provides shareable resources, such as files, memory, processes and threads, which are implemented as "objects" and are accessed by using "object services." As known in the art, an "object" is a data structure whose physical format is hidden behind a type definition. Data structures, also referred to as records or formats, are organization schemes applied to data so that it can be interpreted, and so that specific operations can be performed on that data. Such data structures impose a physical organization on the collection of data stored within computer memory 16 and represent specific electrical, magnetic or organic elements.

An "object type," also called an "object class," comprises a data-type, services that operate on instances of the data type, and a set of object attributes. An "object attribute" is a field of data in a object that partly defines that object's state. An "object service" implements and manipulates objects, usually by reading or changing the object attributes. "Object oriented design" is a software development technique in which a system or component is expressed using objects.

An object typically has two components; a function table, containing a pointer to each object member function (i.e. sometimes known as an object method) defined in the object's class, and a data block, containing the current values for each object variable (i.e. data members, sometimes known as an object property). An application has some reference to the object components through an object pointer. An application obtains this object reference by using a function call (direct or implied) in which that function allocates the object block in memory, initializes the function table, and returns the reference to said memory to an application.

Processes are implemented as objects. A process object comprises the following elements: an executable program; a private address space; system resources (e.g., communication ports and files) that the operating system allocates to the process as the program executes; and at least one "thread of execution." A "thread" is the entity within a process that the operating system kernel schedules for execution. As is well known in the art, each thread has an associated "context", which is the volatile data associated with the execution of the thread. A thread's context includes the contents of system registers and the virtual address belonging to the thread's process. Thus, the actual data comprising a thread's context varies as it executes.

An application environment 410 contains one or more software application processes 411, 414. The applications 411, 414 can be any variety of applications for use on the remote unit 15. For example, the application 411 can be a browser for connecting to a network such as the Internet, or for data collection and entry into a form or template by bar code scanning. The application 414 can be a configuration program that configures the remote unit 15 for use with the network to which the remote unit 15 connects.

Many computer application programs such as those used in data collection, inventory control, databases, word processors, spreadsheets and the like employ graphical user interfaces (GUIs) which make the use of the application "user friendly". A graphical user interface provides simple interactive tools for the input, manipulation and display of data as ell as program execution control through the use of windows, icon, menus, tool bars, scroll bars, command button, option button, text input boxes, dialog boxes and the like. By providing a graphical user interface, the applications developer enables the operator to run the application intuitively and with minimal or no training.

Standard development tools exist which facilitate the development of graphical user interface applications. Using a typical forms-based GUI design tool, a GUI application is divided into screens called forms which represent the major subdivisions of the user interface. Each form is composed of objects or controls with associated fields which allow data entry by the operator, display data from the program, provide instructions to the operator, allow operator control of the program, and the like. Types of controls available in commercially available GUI development tools include text boxes for alphanumeric data entry by the operator, check boxes for yes/no data entry by the operator, option buttons for choice selection by the operator, command buttons to facilitate predefined event procedures, object frames for display of a graphical object to the operator, and labels for displaying information on the form such as operator instructions.

Each control type is defined by a particular subset of properties taken from a set of standard properties which are common to all control types. Property values determine the look and behavior of the control. For example, every control has a control name property, a control type property, and a caption property. In addition, certain control types have may have unique properties not used by the other control types.

Applications developers implement their programs by selecting controls from a menu of control types and placing control in the desired location on the form. The properties associated with the control type select are then defined by the developer in order for the control to behave in desired fashion. Each control type is implemented by a code module that defines the behavior for that control type which can be adjusted by setting the values of the properties defined for that control type. For example, a text box control type accepts data input into its associated field from the keyboard. In a calculation application, a text box allows the operator to enter numbers from the keyboard for subsequent arithmetic computation. Other types of control execute specified routines selected. Thus, in the bar code scanning application, the operator would use key, trigger switch, or can icon to select a command label SCAN DATA ENTER, which call a subroutine to activate a bar code reader and receive data input.

By using predetermined control types, an operator can learn to use different graphical user interfaces quickly since they appear to operate in the same fashion. That is, a command button will appear the same to the operator o different applications, and the operator will expect it to operate in the same fashion regardless of the particular application. A prime example of this are programs written for operation in the WINDOWS environment, where different programs have similar elements such as pull-down menus, window size control buttons, help menus and dialog boxes which operate in a similar fashion in all applications.

It is desired to be able to develop such graphical user interfaces for use in applications associated with data terminals and similar and similar devices having automatic data input capabilities such as bar code scanning. Data terminals have many applications where an operator desires to collect data either by keyboard entry or by automatic entry such as by scanning a bar code resident on a parcel package, product label, shelf tag or the like. In particular, it is desired to be able to allow the operator to have the option of either scanning a bar code with the target data encoded therein, or to enter data directly into the application if the bar code is damaged and unreadable. By providing a graphical user interface which allows both manual keyboard data entry as well as automatic bar code scanning data entry into the same field, data terminal operators can benefit from the user friendliness and intuitive features of such graphical user interfaces.

Programmers who desire to implement automatic data entry such as bar code scanning with selecting communications links, or attributes of such links, into a single applications have been heretofore constrained to develop routines and decide on case by case basis, which is time consuming, tedious, and costly. Most often, the applications so developed was different every time, so that operators always had to re-learn each new application.

The present invention furnishes applications developers with a standard methodology in an applications development environment for integrating such bar code input capabilities in a convenient manner as is currently available with other features of graphical user interfaces for maintaining communications connectivity in local area, or wide area, network environments with hand-offs between the two.

The present invention also provides a custom control for a graphical user interface which is scan-ware in that it facilitates the input of text data into the field by either manual keyboard input of by an automatic bar code reading device.

The present invention also provides such a scan-aware custom control which operates in an intuitive fashion so as to enable an operator to use it with little or no instruction, and integrates with exiting application development environments and which operates in a similar fashion to existing standard controls so as to be easily implemented by an applications developer.

Each application 411, 414 can have one or more processes 412, 413, 415, 416 respectively, associated with them. These processes can serve a variety of purposes related to the applications 411, 414. For example, one or more of the processes can be a dynamic link library (DLL) 412, 413, and 415, 416 respectively associated with it. A DLL is a feature of Windows platform that allow executable code modules to be loaded on demand and dynamically, and linked at run time. Library code can be updated, transparent to the application 411, 414, and unloaded when no longer needed.

The operating system 430 can include an application programming interface 490 (API). The API 490 is the software that the application processes 411, 414 use to request and carry out lower level services performed by the operating system 430. For Windows, the API also helps applications 411, 414 manage windows, menus, icons and other graphical user interface (GUI) elements. The API 490 includes a set of standard software interrupts, calls and data formats applications 411, 414 use to initiate contact with device drivers 450, 460.

The operating system 430 can include one or more device drivers 450, 460. The device drivers 450, 460 provide control functionally specific to a particular physical device or class of devices. Additionally, the device drivers 450, 460 provides standard software interfaces allowing other system components to access the controlled device. For example, one device driver 450 can control the code data acquisition device 343 and provide data to and from applications 411, 414 through the API 490. The other device driver 460 can control the RF transceiver 344 that allows data to be transferred from operating system 430 to the RF transceiver 344 through device driver 460. Operating system 430 also includes a BIOS 402 to run standard start up routines for the remote unit 15.

A variety of application programs can be included in the operating system. One such application is a WLAN auto configuration program. Since the remote unit 15 can be associated with a single WLAN having base stations 12, 13, 14, or multiple unrelated WLANs having multiple unrelated base stations, it is necessary for the mobile unit 15 to be able to configure itself to adapt to and communicate with one or more of several possible WLANs within range. This auto configuration program can enable a user to store configurations for numerous WLANs such that when a user turns on the mobile unit 15, the program automatically loads the correct configuration for each of the WLANs that the mobile unit 15 detects that it is near. As the number of WLANs increase, it is very useful for the user to be able to connect to the WLAN where he is physically located without being required to use the time to manually change the computer's configuration settings to associate with the WLAN and Internet.

Figure 4:
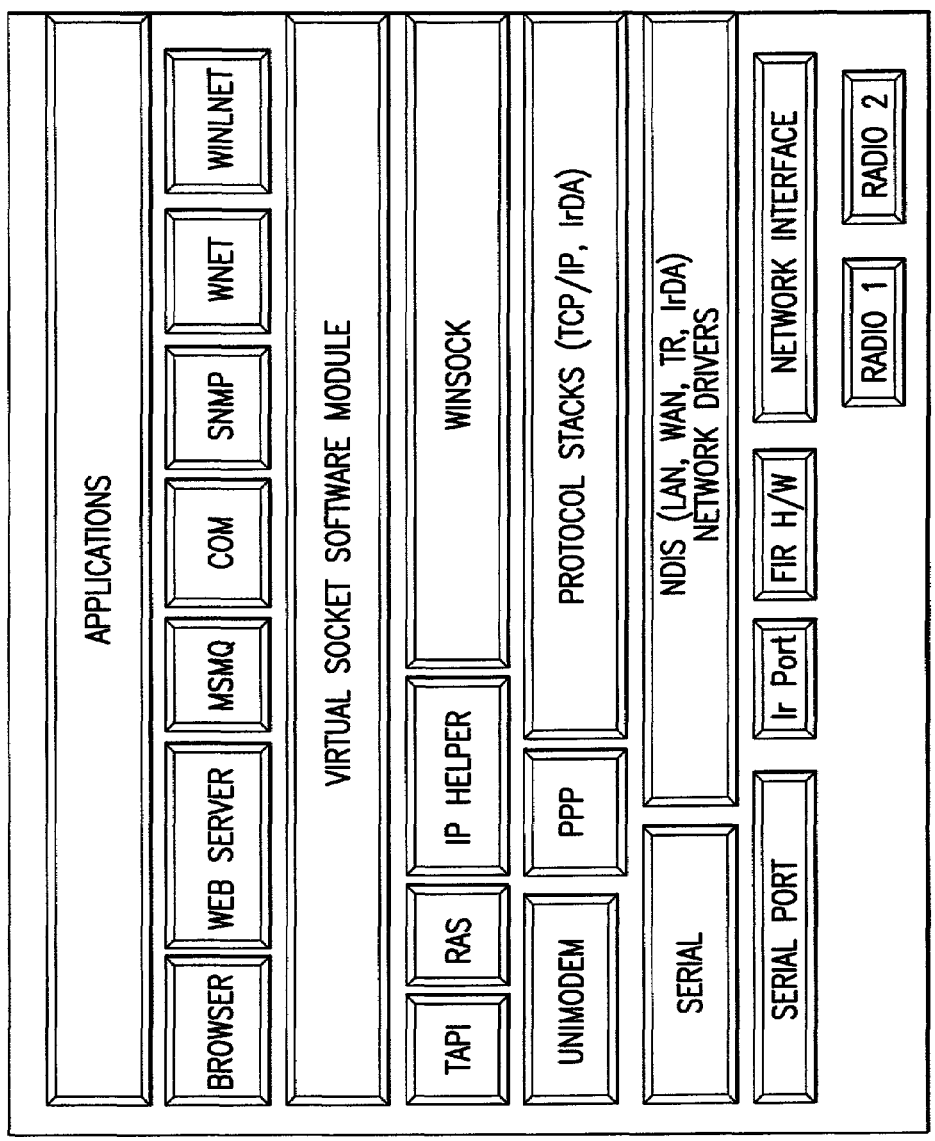
FIG. 4 illustrates the software architecture of a Windows CE mobile unit according to the present invention.

FIG. 4 illustrates the software architecture of a Windows CE mobile unit according to the present invention in which the Virtual Socket layer is implemented between the Winsock and the applications.

Figure 5:
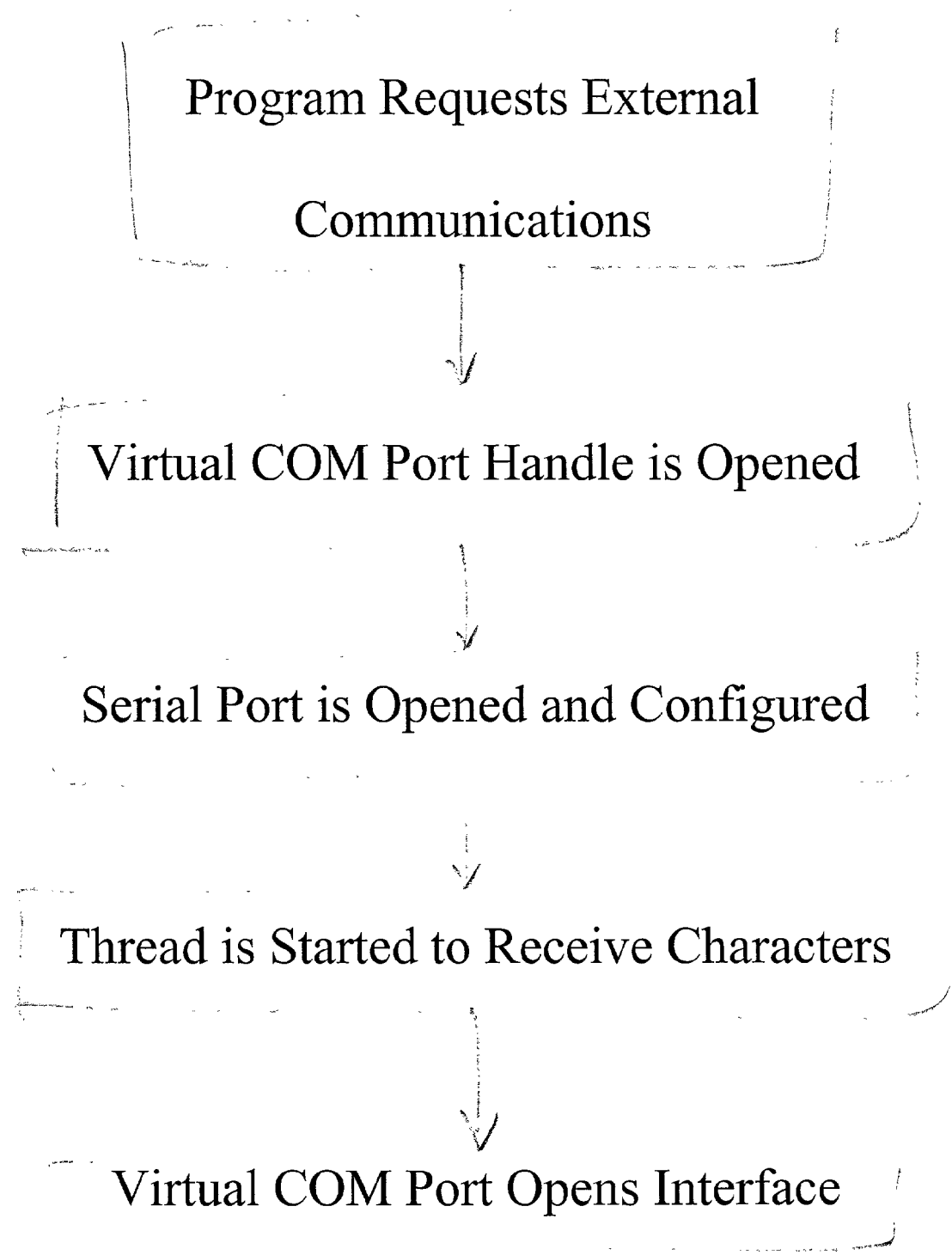
FIG. 5 illustrates a process flow diagram of a software and protocols according to the present invention.

FIG. 5 is a process flow diagram of the software according to the present invention.

One feature of the present invention is that the communications interface software module emulates a standard communications API, such as a serial port, so that calls to the standard communications API from legacy applications are capable of being processed by said software module. A typical example of a widely deployed software application used in mobile computers is a data collection application utilizing a bar code reader to input data to the computer.

Another feature of the present invention is the step of temporarily storing information received from the data collection application that is intended for transmission to the second computer, during such time that a communication session is suspended, and then subsequently transmitting the stored information to the second computer upon resuming the communication session. Following the step of resuming communications, the communications interface software module forwards all information received from the data collection application and intended for the second computer to the second computer.

More specifically, FIG. 5 depicts a flowchart of the process steps according to the present invention. It is assumed that there are software applications in both computers, which are executing and one program needs to communicate with the other over a wireless communication link. In another embodiment, the wireless link does not have to be used, but some other criteria is tested periodically to determine if one link over another link should be used. The computer making such a determination would initiate a channel link selection process according to the present invention.

As set forth in FIG. 5, there is an application program interface in a computer that allows application programs executing in the computer to access a wireless RF input/output facility or port in the computer, by emulating a serial port in the computer, including the steps of; opening a handle to a virtual COM port from an application program executing in the computer; and opening and configuring a serial port by the application program then a thread is started to receive characters to be communicated through the RF facility; and the virtual COM port is utilized to open a component interface to allow communications through wireless RF communications.

As noted above, another possible process step is that a search is made for an that most suitable communication channel meeting certain criteria (e.g. bandwidth, reliability, coverage, quality of service, security, etc.). Thus, over a cause of time, or a communications session, the application which has been running on the computer is suspended so that the fact that data is no longer received by the application being received does not cause a halt or other malfunction in the application program. With the application program properly suspended, a search can be made for an alternative channel over as long as period of time as is necessary in order to complete a new link. Such a search for the suitable alternative communication channel can be made according to techniques known in the art by using different communication programs searching for different channels, different frequencies, or different networks. Assuming that a new channel is found which re-establishes communication to the remote computer, an acknowledgement is received by the sending computer, that the channel is acceptable to the receiving computer and the alternate link is established.

The virtual COM port is in communication with the serial channel and initialization routine is set-up in order to establish communication over the wireless communication channel utilizing the two corresponding virtual sockets. Once such initializing program has been completed, the pending application programs in the computer can be taken out of the suspend mode, and communication established at the point at which the application programs have been suspended. Thus, according to the present invention, re-establishment of communication channels through virtual COM ports is implemented in each of the corresponding computers without making use of a central controller or other type of intermediate controller or gateway. Such software applications allows communication between two computers to be re-established regardless of the specific type of communication network, or the facilities available in such networks.

Figure 6:
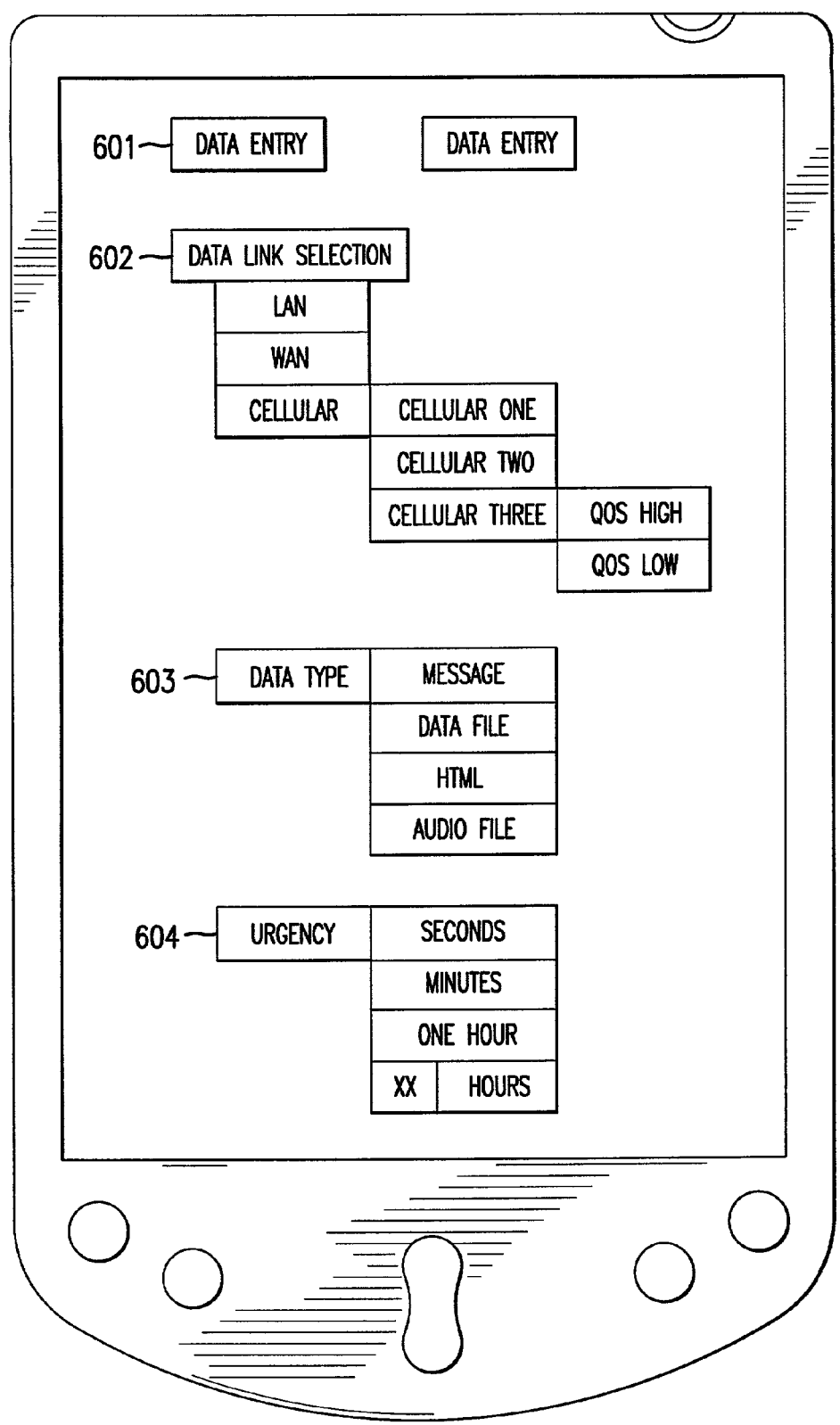
FIG. 6 illustrates a screen shot of the display in the mobile unit depicting a form or template which allows a user to enter data by bar code scanning for use in an application, and configuring the software for specifying a network configuration channel criteria according to the present invention.

FIG. 6 illustrates a screen shot of the display in the mobile unit depicting a form or template which allows a user to enter data by bar code scanning for use in an application, and configuring the software for specifying a network configuration channel criteria according to the present invention.

FIG. 6 shows a view of the screen of a mobile terminal including a scan data entry field, and menu selections for configuring the communications software according to the present invention. The windows at the left correspond to the profile selected by the user for scan data entry, such as customer name, company, location, product, action required, and so on. The windows to the immediate right such variable comprise either pull down menu items corresponding to the options which may be chosen by the user to correspond to such variables, or as an open item for scan data entry. For example, window item 601 indicates the data entry field from the data collection input, such as a scanned bar code. Window number 602 indicate the data link to be used for that is, a LAN a WAN, or a cellular telephone network, with a pull-down menu to select a carrier. Window 603 indicates the data type of the message to be sent such as a text or numeric message, data file, HTML file, or audio file and window 604 specifies the urgency in terms of time by which the message is to be delivered. In the specific application illustrated, the scan data entry fields could include items such as a customer name, company name, product, model number, quantity, delivery data, rice, and so forth which may be customized by the user using a profile, so that the scanned data convey to the destination station the desired data and a form according to the profile information.

Although the illustration of the screen shot with the profile and scan data entry parameters chosen for a typical data capture, and database customer inquiry application is purely exemplary, various other screen designs and window arrangements for conveying information to the user would be known to those skilled in the art. The key feature of the present invention is that various fields of the screen profile provided on the screen template or display are utilized by data capture from the scanning of a bar code symbol containing encoded text or encoded data representing information to be placed in such template field or location. After such entry has been visually verified by the user on the display of the mobile unit, the user then is immediately able to execute an application, and communicate with a remote station by program control means, a single point and click, or pressing a function key or "send data" button on the mobile unit.

The automatic data capture of information through bar code reading, automatic periodic comparison of communications link in a priority order selected by the user in a form template presented as a GUI on the screen of the mobile unit, and the automatic, transparent reconfiguration of the wireless data link at times selected by the user at the mobile terminal is a key aspect of the present invention which is believed to provide simplicity of use, efficiency of use of bandwand and cost effective savings in the data capture, database browsing and information transfer processes contemplated for many different user applications.

Another aspect of the present invention is to utilize a graphical user interface which enables a user to develop and specify scanning, data link, application type, or other notification operational parameters for a mobile unit through the use of icons, buttons, meters, slides, or other objects implemental on a interactive display. For example, for the data link selection, the present invention may also provide an interactive display to the user depicting a graph or list of the carriers, servers, networks, or users, wherein points represent mobile units, network nodes, gateways, service providers, radio paging services, or other well known designated network units together, while lines represent channels, links, or other connectivity media. The user may define the message delivery architecture by pointing and clicking, or drag and dropping, on such objects on the display as is well known in the art so as to achieve the desired notification schedule. One such architecture is specified by a user, it may be implemented as a software file and sent to the actual various network elements represented, along with activation schedules, to indicate the duration, context, or other bounds with which the message service is to be configured.

Figure 7:
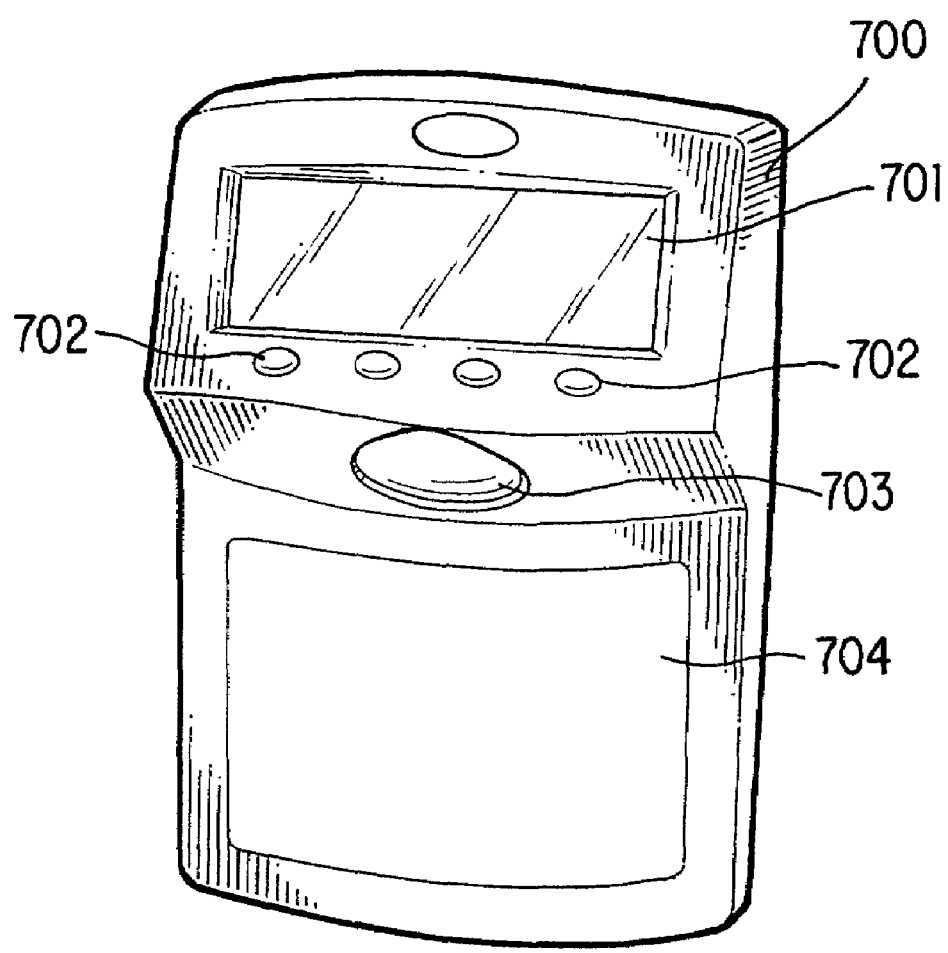
FIG. 7 is a perspective view of a stationary bar code scanner and computer unit that may be used in a local area network according to the present invention.

FIG. 7 depicts an interactive, automated fixed mount customer self-service terminal 700 including a laser scanning bar code reader, as exemplified by Model MK1000 of Symbol Technologies, Inc of Holtsville, N.Y. The terminal 700 includes a display 701, user function buttons 702, a window 703 from which a scanning laser beam is emitted, and a panel 704 for optional function, including coupon printing.

Installed at convenient locations throughout a retail store, the MK1000 allows customers to quickly and easily verify bar coded merchandise and obtain up-to-the-minute information on in-store promotions while they shop.

The MK1000 has a large, easy-to-read-display which can be used as an electronic billboard for instant in-store merchandising by displaying graphics and text messages to promote seasonal sales, in-store promotions and upcoming events. The programmable function keys enhance the in-store applications and allow for customer interaction by responding to prompts.

The integrated scanner allows customers to simply pass a bar code label on a product in front of the MK1000 scan window in any position or orientation and the latest pricing, product description, promotional and frequent shopper information appears in the large, easy-to-read display. The terminal may be mounted on end-aisle displays and other high-visibility locations, or on shelves, racks, or counter-tops.

The unit may include the software of the present invention, and be installed over an existing wired network over wireless LAN to a host computer.

Figure 8:
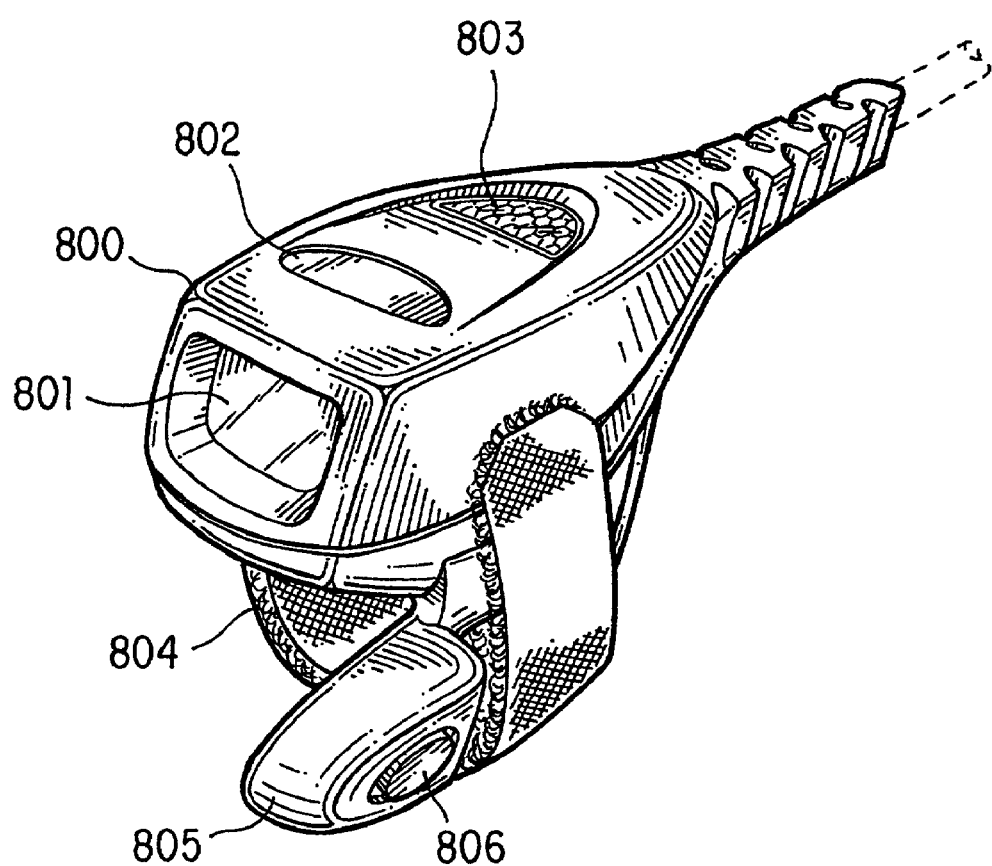
FIG. 8 is a perspective view of a wearable bar code scanner that may be used in a network according to the present invention.

A wearable optical scanning system is shown in FIG. 8. The system as a whole may comprise several separate elements. The first individual element, described generically, is a ring scanner module, adapted to be worn on the finger of a user; a trigger module for mounting on or with the ring; and a wrist mount unit (not shown) including a computer, radio, display or other components. They may be several varieties of each type of element available, from which the user may pick and choose, according to his or her preference, e.g. for left hand or right hand use and/or the scanning application in question. Once the appropriate elements have been chosen, the user slides the ring onto a finger, positions the trigger module, and connects the wrist mount onto the wrist. The chosen trigger module is then secured to the ring, and the chosen wrist mount unit coupled to the ring by cable or otherwise.

In use, the user simply points the finger carrying the ring in the direction of an indicia to be scanned and depresses the trigger. The scanner module provides a fixed or scanning laser beam that exits the window 801 which scans across the indicia. Light reflected from the indicia is received a detector, and is decoded. A signal is then passed from the ring to the wrist mount unit for onward transmission and/or storage, display, and analysis. The wrist mount unit may include the software of the presetn invention for communicating over a wireless RF link.

Turing now to the mechanical features of FIG. 8 in more detail, it will be seen that the preferred ring unit 800 comprises a mounting strap 804 for releasably mounting the scanner module. The band may come in various sizes, so that a user simply picks one of the appropriate size, or alternatively it may be adjustable in size. The side of the ring includes a trigger module 805 with a micro switch 806 for turning the scanner module on and off, or activating the scanning laser beam.

A key design feature of the invention of FIG. 8 is that the trigger module 806 is positioned forward of the ring so that the thumb may be positioned over the switch 806 while triggering, whole the ring is positioned comfortably on the back end of the finger.

The scanner module may come in various varieties, and include a display 802, and an indicator light or panel 803. For clarity, the module in FIG. 8 is shown with the trigger module attached and in position for right hand use and activation by the thumb. The scanner module incorporates a miniature scanner including a source of light such as a laser beam and a scanning mechanism for scanning the resultant beam. Detection optics are also provided within the module to detect light which has been reflected from the indicia and being read. The module generates electrical signals representative of the reflected light, these being passed on to the appropriate wrist mount unit via a cable. Alternatively, the module maybe is arranged simply to provide a fixed laser beam. In order to cause the fixed beam to scan across an indicia to be read, the user manually moves the hand on which the ring is mounted. As before, reflected light from the indicia is detected by the unit, and signals are passed on along a cable. Yet a further embodiment includes a radio transmitter rather than a cable in order to transmit data to wrist mount unit, or other wearable or remote unit. The wrist mount may be provided in a variety of styles, and sizes for different users, or alternatively the mounts may be adjustable in size.

Various aspects of the techniques and apparatus may be implemented in digital circuitry, or in computer hardware, firmware, software, or in combinations of them. Apparatus of the invention may be implemented in computer products tangibly embodied in a machine-readable storage device for execution by a programmable processor, or on software located at a network node or website which may be downloaded to the computer product automatically or on demand. The foregoing techniques may be performed, for example, on a single central processor, a multiprocessor, one or more digital signal processors, gate arrays of logic gates, or hardwired logic circuits for executing a sequence of signals or program of instructions to implement aspects of the invention by operating on input data and generating output. The methods may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be compiled or interpreted language. Suitable processors include, by way of example, both general and special purpose microprocessors. Generally, a processor will receive instructions and data from read-only memory and/or random access memory. Storage devices suitable for tangibly embodying computer program instructions and data include all forms of non-volatile memory, including by way of example, semiconductor devices, such as EPROM, EEPROM, and flash memory devices; magnetic disks such as internal hard disks and removable disks; magneto-optical disks; and CD-ROM disks. Any of the foregoing may be supplemented by or incorporated in, specially designed application-specific integrated circuits (ASICs).

It will be understood that each of the elements described above, or two or more together, also may find a useful application in other types of constructions differing from the types described above.

While the invention has been illustrated and described as embodied in a serial port emulation program for a portable terminal or bar code reader, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by letters patent is set forth in the appended claims.

We claim:

1. A method for communicating between a bar code reader and a computer terminal, comprising:
    collecting data at a wrist-mounted portion of the bar code reader via a finger-mounted bar code scanner, the finger-mounted bar code scanner comprises a trigger switch coupled to a ring, the trigger switch disposed forward and to a side of the ring; and
    allowing at least one application program executing in the wrist-mounted portion of the barcode reader to access a wireless radio frequency (RF) input/output port via an application program interface (API) to transmit data to the computer terminal.

2. The method of claim 1, the API emulates a standard communications API.

3. The method of claim 1, wherein the at least one application program in the wrist mounted portion of the bar code reader is a data collection application.

4. The method of claim 3, temporarily storing information received from the data collection application and intended for the computer terminal during such time that the communication session is suspended, and transmitting the stored information to the computer terminal upon resuming the communication session.

5. The method of claim 4, following the step of resuming communications, a communications interface software module in the wrist-mounted portion of the bar code reader forwards all information received from the data collection application and intended for the computer terminal to the computer terminal.

6. The method of claim 1, the wrist-mounted portion of the barcode reader reconfigures its communications by operating at a different data rate on a same channel.

7. The method of claim 1, further comprising configuring the API to utilize a virtual communication (COM) port to open a component interface in the wrist-mounted portion to allow transmission of the data through wireless RF communications to the computer terminal.

8. A system for communicating between a bar code reader mobile unit and a computer terminal, the bar code reader comprising:
    a finger-mounted bar code scanner that scans a bar code and transmits bar code data to a wrist-mounted processor that employs one or more application programs to access a wireless RF input/output port via an API for transmitting the bar code data to the computer terminal, the finger-mounted bar code scanner further comprising a trigger module coupled to a ring.

9. The system of claim 8, the API in the wrist-mounted processor emulates a standard communications API.

10. The system of claim 9, the wrist-mounted processor employs a virtual COM port that opens a component interface in the bar code reader to facilitate transmission of the bar code data through wireless RF communications to the computer terminal.

11. The system of claim 8, at least one of the one or more application programs in the wrist-mounted processor is a data collection application.

12. The system of claim 11, the bar code data is temporarily stored at the wrist-mounted processor during such time that communications are suspended, and transmitted to the computer terminal upon resuming communications.

13. The system of claim 12, wherein following the step of resuming communications, a communications interface software module in the wrist-mounted processor forwards all information received from the data collection application and intended for the computer terminal to the computer terminal.

* * * * *